(No Model.) 6 Sheets—Sheet 1.

J. McTAMMANY.
PNEUMATIC REGISTERING BALLOT BOX.

No. 482,691. Patented Sept. 13, 1892.

Witnesses. Inventor.

(No Model.) 6 Sheets—Sheet 3.
J. McTAMMANY.
PNEUMATIC REGISTERING BALLOT BOX.
No. 482,691. Patented Sept. 13, 1892.

Witnesses.
W. R. Barton
Ella P. Blenus

Inventor.
John McTammany
By Chas. H. Burleigh
Attorney (No Model.) 6 Sheets—Sheet 4.
J. McTAMMANY.
PNEUMATIC REGISTERING BALLOT BOX.

No. 482,691. Patented Sept. 13, 1892.

(No Model.) 6 Sheets—Sheet 5.

J. McTAMMANY.
PNEUMATIC REGISTERING BALLOT BOX.

No. 482,691. Patented Sept. 13, 1892.

(No Model.)  
6 Sheets—Sheet 6.

J. McTAMMANY.
PNEUMATIC REGISTERING BALLOT BOX.

No. 482,691.  
Patented Sept. 13, 1892.

FIG. 11

Witnesses —  
Inventor  
John McTammany  
By Charles H. Burleigh  
Attorney

UNITED STATES PATENT OFFICE.

JOHN McTAMMANY, OF WORCESTER, MASSACHUSETTS, ASSIGNOR TO ALEXANDER McTAMMANY, OF AKRON, OHIO.

PNEUMATIC REGISTERING BALLOT-BOX.

SPECIFICATION forming part of Letters Patent No. 482,691, dated September 13, 1892.

Application filed December 19, 1891. Serial No. 415,659. (No model.)

*To all whom it may concern:*

Be it known that I, JOHN McTAMMANY, a citizen of the United States, residing at Worcester, in the county of Worcester and State of Massachusetts, have invented a new and useful Pneumatic Registering Ballot-Box, of which the following, together with the accompanying drawings, is a specification sufficiently full, clear, and exact to enable persons skilled in the art to which this invention appertains to make and use the same.

The objects of my present invention are, first, to provide an automatic registering ballot-box having a pneumatically-actuated registering mechanism; second, to provide a self-registering ballot-box having a pneumatic action and a series of registering devices adapted for severally registering the votes for each of the respective individual candidates; third, to provide a registering ballot-box having a pneumatically-actuated registering mechanism controlled by a perforated or indented ballot; fourth, to provide a ballot-box having a system of automatic registering devices, pneumatic motors whereby said registering devices are individually actuated, a wind-inducing mechanism, and a mechanical ballot adapted for controlling the pneumatic action by serving as a valve to the pneumatic ducts; fifth, to provide a ballot-box with means for detecting inaccuracy in the markings or perforations of the ballots and means whereby the registration is effected; sixth, to afford a method of testing ballots for inaccuracies of perforations or indentations by sound-producing mechanism controlled by the ballot and air-currents passed therethrough; seventh, to provide a ballot-box with a wind-inducing apparatus, a testing-table or ballot-bed with sounding devices adapted for primarily testing the accuracy of perforation in the ballots by sounding the errors, and also in connection therewith means for locating the defect without removal of the ballot from the apparatus; eighth, to provide a self-registering ballot-box having a system of registering-indicators adapted for indicating the result of the entire ballot by individual subjects, so that the result can be readily ascertained when the balloting is completed, or immediately upon the closing of the polls; ninth, to provide an automatically-registering ballot-box adapted for recounting or verifying the ballots; tenth, to provide a ballot for use in a self-registering ballot-box having the candidates' names arranged thereon in two columns and in inverted or reversed position in the separate columns, whereby the marking or perforated spaces are disposed on the outer edges of the ballot; eleventh, to provide a removable indicating-tablet for automatic registering ballot-boxes, whereby the names of the respective candidates corresponding with those on the ballots can be readily combined with the series of registering or count indicators to denote the individual registers appropriated to the respective candidates. These objects I attain by mechanism the nature of which is more fully explained in the following description, the particular subject-matter claimed being hereinafter definitely specified.

In the drawings, Fig. 9 shows side and sectional views of the removable register-indicating card or tablet.

My invention in ballot-box mechanism includes a system of registering or counting devices severally operated by pneumatic motors, each in communication with an air-duct that leads from a given position in a suitable deposit way or bed on which the ballot is supported, a ballot having spaces corresponding to the positions of said ducts for perforations or indentations that denote on the ballot the names of the candidates to be voted for, and a wind-inducing apparatus and communicating channels arranged and combined in such manner that when a ballot perforated or indented in accordance with the voter's desire to designate his choice of candidates is placed in position on the receiving bed or way and an air-current induced through the ducts the several pneumatic motors whose ducts or windways correspond to the perforations in the ballot, will be caused to operate, thereby actuating the particular and respective registers or counting mechanisms appropriated to said indicated candidates, while the pneumatic motors whose ducts correspond with the non-perforated portions of the ballot will not be affected, each ballot serving as a means for controlling the pneumatic action, and the registering of the vote by individual candidates or items automatically effected by pneumatic action as the successive ballots are deposited and passed into the ballot-box.

An additional feature of my invention is the method of testing ballots for the discovery of errors by sounding mechanism and the employment of means for passing air-currents through the perforated ballots and a series of reeds or suitable sound-producing devices, the ballot serving as a valve for the air-ducts for controlling the production or non-production of a responsive sound accordingly as it is properly or improperly perforated.

The means for testing the ballots and the means for pneumatically registering the ballots can be employed separately, one without the other, if preferred, or be combined to operate together. It will also be understood that some parts of my invention can be employed in ballot-boxes in combination with other mechanism than herein shown, and I desire to include such employment as within the scope of my invention.

In the practical embodiment of this invention in the present instance the mechanism is constructed and organized for operation as follows:

A denotes a box or casing about two feet wide, two feet eight inches long, and three feet high (more or less) in either dimension. At the upper part of said case a series of pneumatics or collapsible and expansible bellows-formed chambers D are arranged, preferably supported in connection with a channel-board C, having therein wind ways or ducts leading to the respective pneumatics.

A series of mechanical counting devices or registering-cylinders G are supported within the case on suitable bearings, and their pawl-actuating levers or driving devices are respectively connected for operation by rods $d$ with the pneumatics D, which latter respectively serve as motors for the respective registering devices G, the collapse and inflation of the pneumatic serving to move the register one step. The registering device G can be of any suitable or well-known style of step-by-step counters, several kinds of which are in the market, and its details need not therefore be more particularly herein described.

Above the pneumatic action, which is covered by the top of the case, there is a bed or deposit-way B, into or upon which the ballot E is introduced or laid preparatory to its passage into the interior of the box, and at the end of said bed is a dropway or chute $a'$ for the descent of the ballot into the containing-chamber $A^2$ within the box. The ballot E, which is designed for carrying out the Australian system of voting, is best formed of card-board or paper having sufficient stiffness to prevent its wrinkling while passing into the ballot-box. The face is divided by lines into a number of uniform transverse spaces $e$, wherein the names of the candidates are written or printed, and such spaces are grouped or classified under the names of the different offices for which nominees are to be chosen or items to be voted for. The names are best arranged in two columns, those in one column being inverted or reversed in position relatively to those in the other column. At the outer edges and corresponding with spaces $e$ there are marked off spaces or squares $e'$, through which the voter perforates or indents the ballot, as at $e^2$, to indicate his choice of candidates, the exact point for perforation being preferably indicated by a printed dot or star, as at $e^3$. In addition to the spaces $e'$ a second series of spaces $e^4$ may, if desired, be formed adjacent thereto, in which the voter can check off his choice of candidates with a pencil or pen, if he so desire, as a guide for his subsequent punching out the spaces $e$. The inverted arrangement of the columns of names brings the spaces $e'$ after the names and at the outer edges of the ballot-sheet for both columns, and also at the right-hand side for convenience of perforation when the names are in upright position. The ballot-sheet may be creased or weakened across its center, as at line $e^5$, to facilitate folding its opposite halves together face to face when desired. This perforated sheet forms a mechanical ballot which when properly placed in the deposit-way of the ballot-box serves to control the pneumatic action, as more fully hereinafter explained. The ballots are best stamped on their backs with a suitable mark for designating the end of the ballot to be first presented to the ballot-box mouth.

Figure 1:
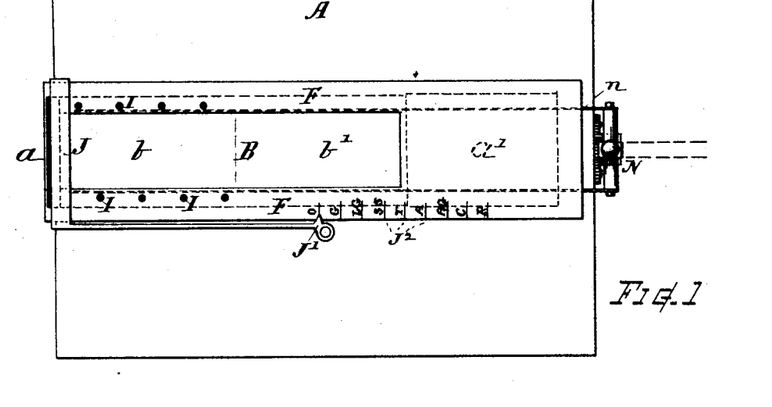
Figure 1 is a plan view showing the top of my pneumatic registering ballot-box.
Figure 2:
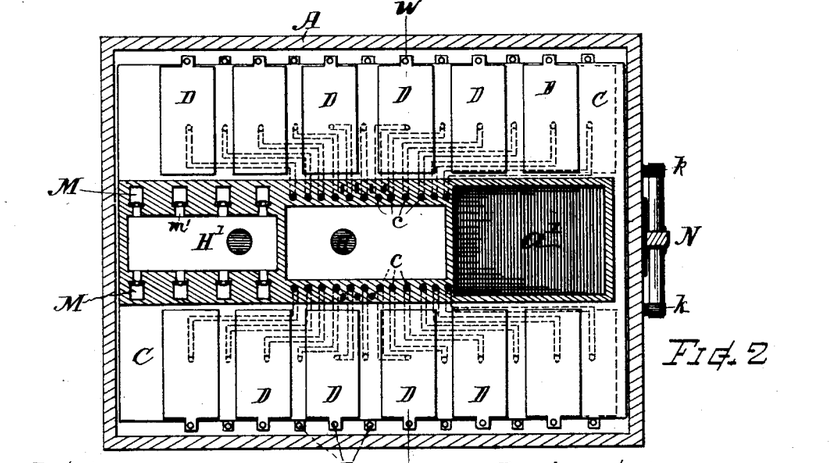
Fig. 2 is a horizontal section at a position just beneath the top board.
Figure 8:
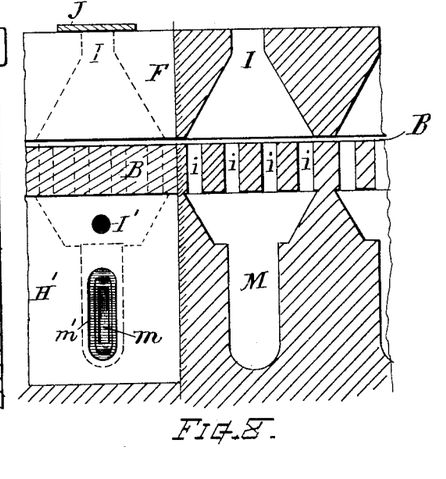
Fig. 8 is a front view and longitudinal section of the same.
Figure 11:
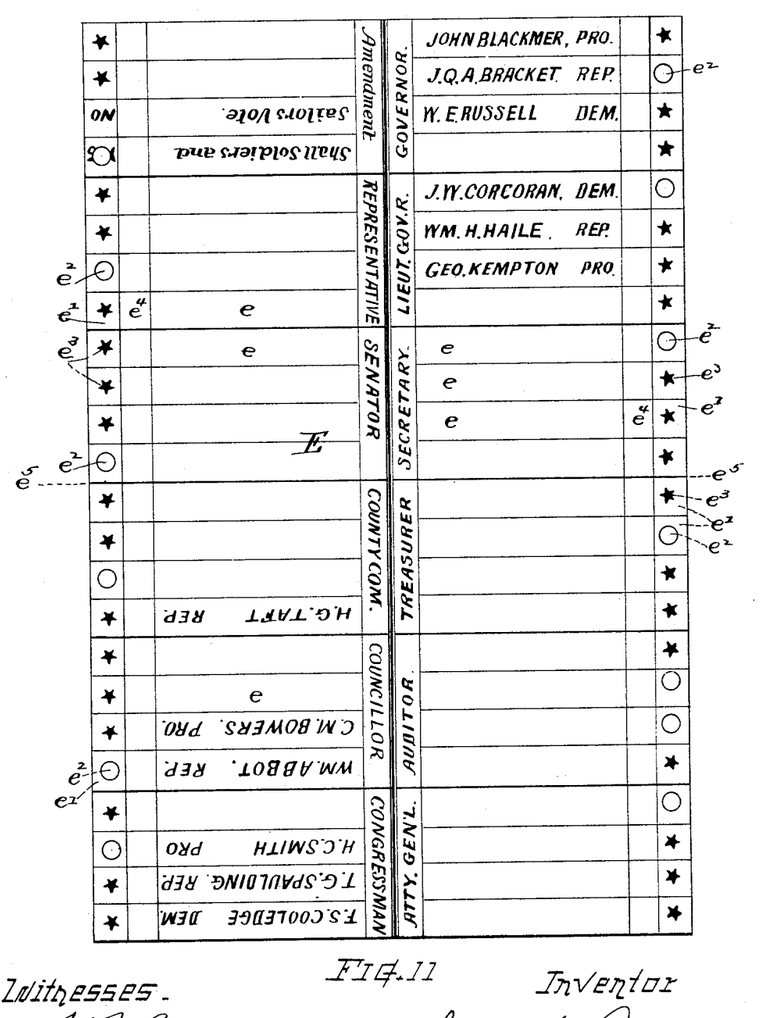
Fig. 11 illustrates a mechanical ballot adapted for use in the automatically-registering ballot-boxes.

The deposit-way or bed B is provided with overlying side pieces or guards F F, that afford grooves along the bed wherein the edges of the ballot slide and by which the markings thereof are concealed while advancing it from the entering mouth $a$ to the dropway $a'$, through which it falls into the containing-chamber $A^2$. The voter inserts his ballot at the mouth $a$, face downward, sliding it forward on the bed with its edges beneath the guards F until it occupies the proper position, which may be indicated by any suitable mark or stop. The bed B has in the present instance two divisions or portions $b\ b'$, which are successively occupied by the ballots, the first division being for testing the ballot to discover errors and the second division for effecting the registering of the ballot. This second division $b'$ has combined therewith the series of ducts $c$, that lead downward into the channel-board C and thence to the pneumatics D. Said ducts open to the bed at positions spaced to correspond with the perforatable portions of the ballot E. The overlying guards F are chambered at $f$ and provided with a series of inlet ducts or apertures directly over or opposite the ducts $c$, and windways $h$ extend from the chambers $f$ down into a wind-chest H, that communicates with the exhaust-bellows K, by which air-currents can be induced through said windways. The first section $b$ of the bed has combined therewith a series of reed-cells M, containing reeds $m$, with passages $l'$ and $m'$ opening therefrom into a wind-chest H', that communicates with the bellows K. A series of ducts $i$, corresponding with the perforatable spacings of the ballot, lead through the bed into the reed-cells. In the present instance four ducts corresponding to the office groupings on the ballots lead into each reed-cell. (See Fig. 8.) The overlying pieces F have windways I through them, which form a suitable opening at the top, and are spread so as to cover the four ducts $i$. The passage $l'$ is made the same size as one of the ducts $i$ and is open for the free passage of air from the cell M to the exhaust-chamber H'. Thus when but one perforation occurs in any office group on the ballot all air that enters the cell will pass through the hole $l'$; but if more than a single perforation occurs in any group of the ballot then a surplus of air enters the corresponding cell M, more than can pass through the hole $l'$, and such surplus is drawn through the passage $m'$ and reed $m$, thereby producing sound from the reed and calling the attention of the attendant to the fact that the ballot is informal in its perforation by reason of two candidates for the same official position having been voted for, as at $e^6$, Fig. 11. The windway-openings I in the two overlying pieces are disposed in alternate order, and a sliding bar or stop-valve J is provided, whereby any one of said windways can be stopped. Said bar is provided with a handle carrying an index $j'$, that moves in conjunction with a series of graduations $j^2$, (see Fig. 11,) that correspond with the names of the office groups upon the ballot. (See Fig. 1.)

When testing a ballot and a reed has sounded, to ascertain at what part of the ballot or in which office the informality occurs the attendant moves the slide J until it covers the proper windway for stopping the sound. Then the index $j'$ shows at what part of the ballot the error occurs and the back of the ballot can be stamped without removing it from the bed, denoting the fact of an error, and the voter can then and there mark or specify as to which of the candidates perforated for he desires should receive the vote, so that the error can be corrected on the final returns, since in such instances the automatic registering mechanism would count in both perforations.

Suitable feed devices or hooks $n$ are provided for moving the ballot from one position to another along the bed and into the drop-way. Said hooks traverse in guideways $n'$ along the guards F, as indicated, their rear ends being connected to a swinging hand-lever N, by means of which the feed and the wind-inducing mechanism or bellows are operated, said bellows being connected to the lever, as at $k$, so that the bellows is closed for discharging its air through the valve $k'$ as the lever swings back and is then ready to exhaust the chambers H H' by action of the spring S as the lever and feed-hooks are moved forward and while the ballot is lying on the bed. Stops or friction-dogs $n^2$, arranged on the guards F, prevent the ballots from moving backward when the feed-hooks are passed over them for gaining a new hold on the ballots. If preferred in any instance, the bellows can be arranged to operate by a foot-treadle in lieu of the hand-lever N.

The sides of the case adjacent to the registering devices G are provided with doors or shutters P, that afford access to said registers for readjusting them after use or for other purposes. Such shutters are to be securely locked during the balloting, but are provided with a glass plate P', fixed therein. An outer door or shutter L is provided that can be opened for viewing the registers through the glass without giving access to the interior of the case.

Figure 3:
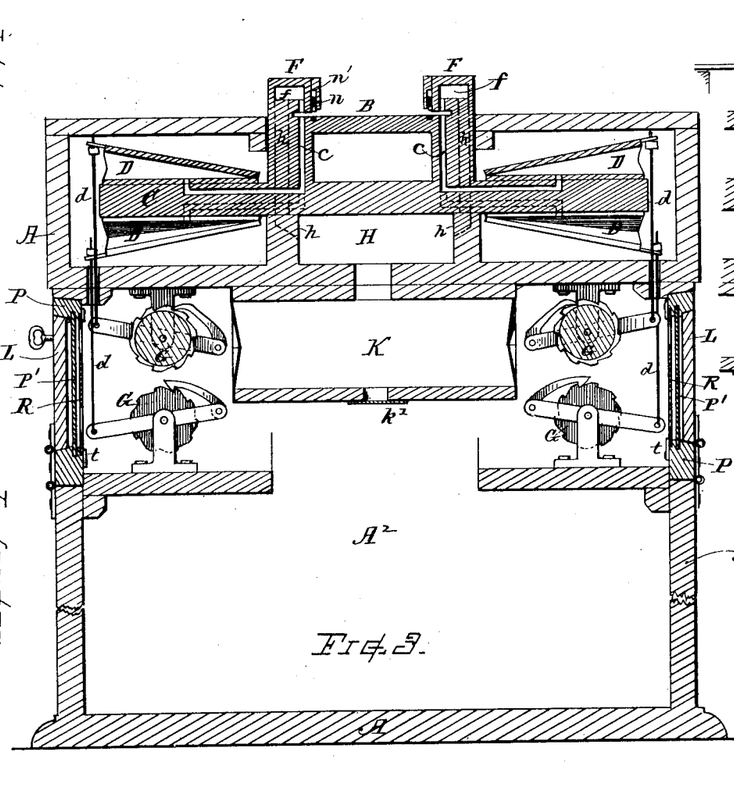
Fig. 3 is a transverse vertical section at line $w\,w$, Fig. 2, drawn to somewhat larger scale.
Figure 4:
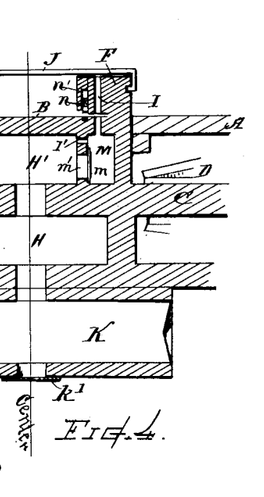
Fig. 4 is a part transverse vertical section through the sound-producing mechanism.
Figure 5:
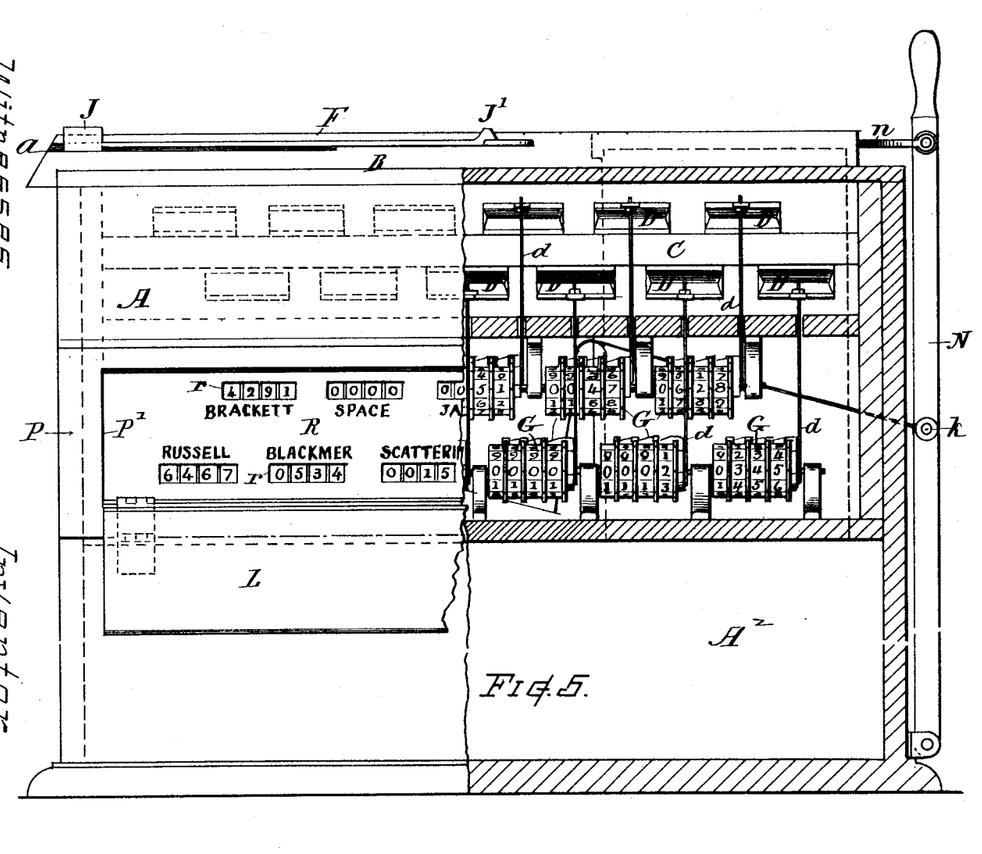
Fig. 5 is a side elevation, part exterior and part with the side removed, to show the pneumatic motors and registering mechanism.
Figure 9:
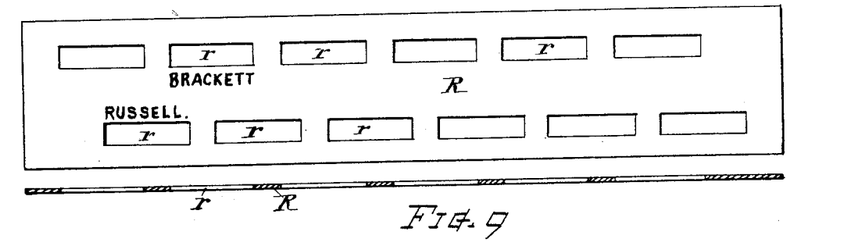
Figure 10:
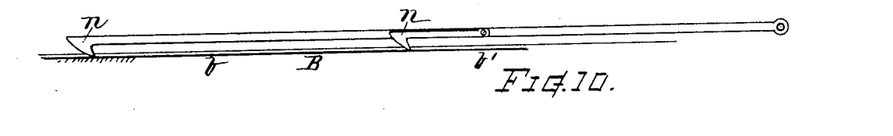
Fig. 10 shows a form of feed-hook for advancing the ballots into the ballot-receptacle.

The names of the candidates being different at different times of balloting, the several registering devices are at different times appropriated to different names. Therefore to facilitate this change I provide a removable card or tablet R (see Figs. 3, 5, and 9) suitable to fit the space in front of the registers G and provided with a series of openings $r$, that correspond to the several register-indicators. Upon this card or tablet the names of the candidates are arranged in accordance with their positions on any particular ballot, and such card is for that particular election inserted in the sides of the ballot-box, where it is held by suitable supports $t$. This tablet shows which registering-cylinders are appropriated to the particular candidates, so that the registered vote for any individual can be read off as soon as the vote is cast and the full returns made up immediately on the completion of the balloting.

In the operation of balloting the voter prepares his ballot by perforating, and then slides it endwise into the receiving-way at $a$ to the proper position on the bed. A movement of the bellows tests the ballot, as above described. As the lever N is moved forward by the attendant the hooks $n$ pass over the ballot. Then the attendant by drawing back the lever N shifts said ballot from the first division $b$ to the second division $b'$ of the bed and another voter can enter his ballot to said first division. Then by action of the bellows the pneumatic motors and registering devices are caused to register for such candidates as have perforations against their names on said first-deposited ballot, and at the same time said second-deposited ballot is tested on the first division $b$ of the bed. The next backward movement of the lever N or feed devices carries the first-deposited ballot into the dropway $a'$, where it falls into the containing-chamber $A^2$ and shifts the second-deposited ballot to the division $b'$, so that a third ballot can be introduced to the bed at $b$. In like manner the balloting can proceed, each succeeding ballot being primarily tested and subsequently registered according to the individual candidates or items indicated by the perforations or indentations thereof. When the balloting is completed, the result can be read from the registering-indicators and at once noted on the returns.

If it is desired, a verification or recount of the ballots can be made by simply passing the ballots through the apparatus a second time, and if the indicators then show a result or count exactly double that registered by their first passage through then the count may be considered correct by proof of the automatic reregistration equaling the first, or each passage of the ballots giving one-half of the amount shown by the double registration.

Figure 6:
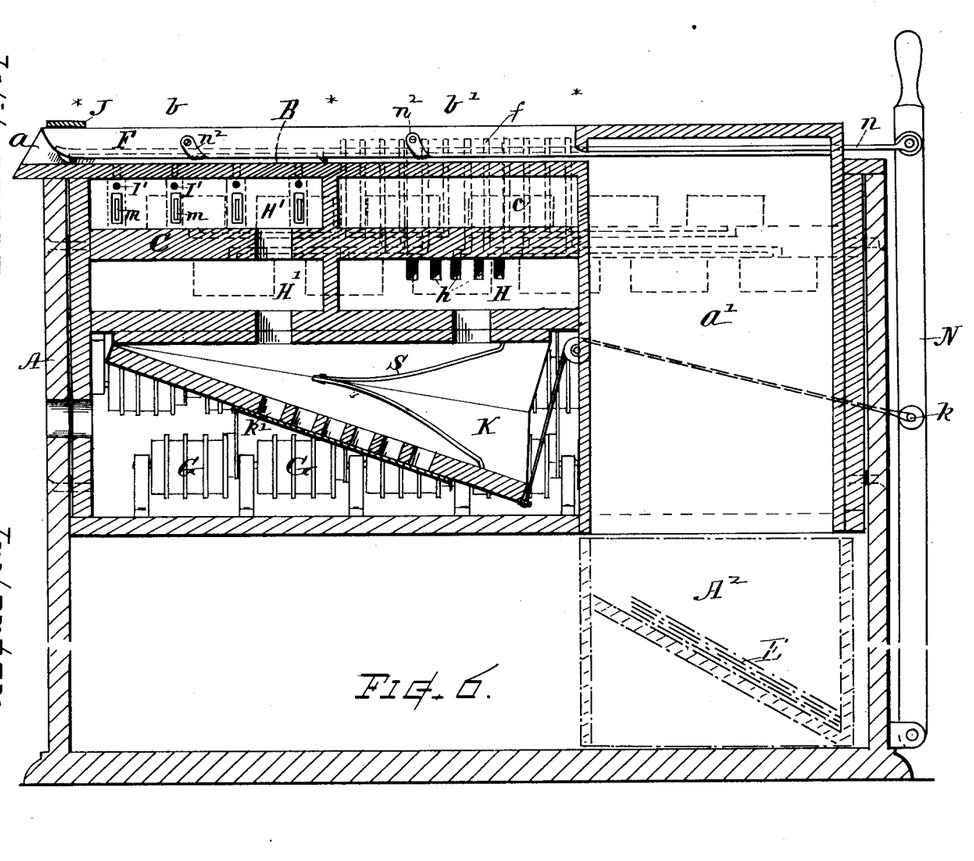
Fig. 6 is a longitudinal vertical section through the center of the apparatus.
Figure 7:
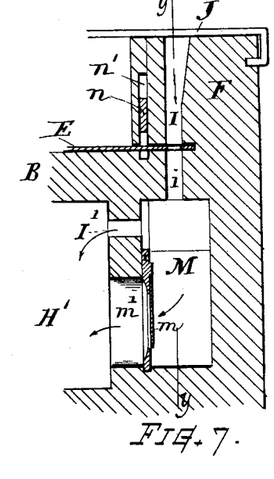
Fig. 7 is a transverse section showing the full detail of the sounding mechanism.

To cause the ballots to pile in regular order, a drawer having an inclined bottom can be employed beneath the dropway $a'$, as indicated by dotted lines at V, Fig. 6.

It will be understood that in practice this ballot-box may be provided with any desired number of registering devices, operating-pneumatics, and air-ducts, as many being employed as will accommodate all the names or spaces on any ordinary ballot; but in the present drawings I have shown a less number in the series, as the principle of construction is the same with each set of the series.

I claim as my invention, to be secured herein by Letters Patent—

1. A ballot-box comprising a chamber for containing ballots and a ballot-bed or guideway into or upon which the ballot is deposited and having combined therewith means for testing the ballots for ascertaining if more than one candidate is indicated thereon for the same office, and a count-registering mechanism automatically controlled by the ballot, a dropway into the containing-chamber, and a feeding-carrier whereby the ballot is advanced along said way and into the drop, substantially as set forth.

2. In a ballot-box, a ballot-registering mechanism provided with an operating-pneumatic actuated by air passed through a perforation in the ballot, substantially as set forth.

3. A pneumatic ballot-registering mechanism, in combination with a perforated ballot, a ballot-bed having air-channels, and a wind-inducing apparatus whereby an air-current is caused to pass through said ballot for actuating the pneumatic and registering devices corresponding to the perforations of the ballot, substantially as set forth.

4. In a ballot-box, a counting-register and a mechanical ballot, in combination with an automatically-operating register-actuating mechanism controlled by said ballot, said register-actuating mechanism being arranged wholly below the ballot-bed and at intervening position between the ballot and counting-register, for the the purpose set forth.

5. A ballot-box comprising a receiving-way having a system of air-ducts, a series of pneumatics communicating with said ducts, a series of counting-registers respectively connected for operation with said pneumatics, and a perforated ballot controlling said air-ducts, substantially as set forth.

6. A ballot-box having a bed or way fitted with a series of air-inlet ducts whereon the ballot is caused to rest before its final transfer into the containing-chamber of the box, a series of pneumatic motors respectively connected with said air-ducts, counting-registers actuated by said pneumatic motors, and an opposite series of air-ducts corresponding to the air-ducts of the bed and leading to an exhaust-bellows or wind-inducing apparatus, in combination with a perforated ballot corresponding to the arrangement of said bed and adapted to serve as a valve between said opposing air-ducts, substantially as set forth.

7. A mechanical ballot for automatic registering ballot-boxes, having its face apportioned into a series of spaces for containing the names of candidates, a corresponding series of spaces near the border for indicating-marks, and a second corresponding series of spaces for receiving perforations denoting the candidates for which the ballot will register, said latter spaces containing dots or imprints to denote the proper position for punching the ballot, substantially as set forth.

8. In a ballot-box or vote-registering apparatus, a ballot-receiving bed or guideway having edge pieces or guards that extend along the sides of said bed, with inwardly-overlying parts that form guiding-grooves for the edge of the ballot and that conceal the marked or perforated parts of the ballot when entered therein, substantially as set forth.

9. In a ballot-box, a ballot-receiving bed, table, or guideway adapted for supporting a perforated paper ballot and provided with windways overlying guard-pieces that conceal the perforated parts of the ballot, having passages therethrough that correspond with the windways of the receiving-table, and sound-producing devices disposed in the windways for operation by air-currents passed through the same and controlled by the ballot, for the purpose set forth.

10. The method of testing ballots in which the indicating-marks are formed by perforation of the ballot fabric, which consists in subjecting the ballot upon a suitable bed having windways that communicate with sound-producing devices to the induced current of air passed through perforations of the ballot, whereby said sound-producing devices are made responsive to any excess of inlet air over the normal quantity due to the correct perforation, substantially as set forth.

11. A ballot-box comprising, in combination, a guideway, table, or bed provided with air-ducts for the reception of the perforated ballot and overlying guard-pieces that conceal the perforated parts of the ballot, having a primary and a secondary series of air-ducts that each correspond to the positions of ballot-perforations, a series of reeds or pneumatic sound-producing devices arranged in said primary series of air-ducts, a series of pneumatic motors arranged in connection with said second series of air-ducts, registering devices connected with said pneumatics, a ballot-receiving chamber, and means, substantially as described, for advancing the ballot by stages along said guideway or bed, and bellows apparatus for inducement of air-currents in the windways, substantially as set forth.

12. In a ballot-box, the combination, with the ballot-receiving bed and its overlying guards having windways I, of the reed-cells M, containing reeds $m$, and having free air-passages $l'$ and reed-ducts $m'$, leading into the wind-chest or exhaust-chamber, and a group of air-ducts $i$, leading from the bed into the reed-cell corresponding to the office groups of candidates, substantially as set forth.

13. The combination, with an automatically-registering ballot-box having a series of counters or indicating-registers, of a removable card or tablet having apertures that correspond with the several indicating-registers, through which the figures thereon can be observed, and containing the names of candidates or designating signs corresponding to the ballots for denoting the particular indicating-registers appropriated to the respective candidates, substantially as set forth.

14. The combination, with the ballot-receiving bed or guideway and its overlying guard-pieces, of reciprocating carriers or feeders consisting of rods that run in guideways and having hooks that engage the ballot and means for imparting motion thereto for advancing the ballots by intermittent action along said guideway and into the interior of the ballot-box, substantially as set forth.

15. A ballot-box comprising, in combination, a ballot-testing bed or way provided with a series of wind ways or ducts that communicate with sound-producing devices and an adjustable stop-valve or slide arranged for individually closing or stopping said windways for ascertaining in which of the series any sound is produced.

16. The combination, with the ballot-testing bed and its overlying guards having windways that lead therethrough and communicate with reeds or sound-producing devices, of a slide or adjustable stop-valve for individually closing the entering windways, means for shifting said stop-valve, and an indicating-scale to denote the official title of the candidate or candidates on that portion of the ballot corresponding with the windways over which said stop-valve is adjusted, substantially as and for the purpose set forth.

17. In a ballot-box comprising a series of indicating-registers and automatic operating mechanisms, the combination, with said registers, of a securable door or glazed shutter, a designating tablet or card supported in front of said indicating-registers, and a second door or shutter affording access to said glazed shutter, substantially as and for the purpose set forth.

Witness my hand this 9th day of December, A. D. 1891.

JOHN McTAMMANY.

Witnesses:
CHAS. H. BURLEIGH,
ELLA P. BLENUS.